US007414628B1

(12) United States Patent  
Andrews

(10) Patent No.: US 7,414,628 B1
(45) Date of Patent: *Aug. 19, 2008

(54) METHODS AND SYSTEMS FOR RENDERING COMPUTER GRAPHICS

(75) Inventor: Jeff Andrews, Sunnyvale, CA (US)

(73) Assignee: Microsoft Corporation, Redmond, WA (US)

(*) Notice: Subject to any disclaimer, the term of this patent is extended or adjusted under 35 U.S.C. 154(b) by 491 days.

This patent is subject to a terminal disclaimer.

(21) Appl. No.: 11/248,854

(22) Filed: Oct. 12, 2005

Related U.S. Application Data

(63) Continuation of application No. 10/706,493, filed on Nov. 12, 2003, now Pat. No. 7,088,368.

(51) Int. Cl.
G06T 1/20 (2006.01)
G06T 1/00 (2006.01)
G06T 15/00 (2006.01)

(52) U.S. Cl. .................. 345/506; 345/418; 345/419

(58) Field of Classification Search ............ 345/506, 345/556, 559, 418, 419, 426, 427, 592
See application file for complete search history.

(56) References Cited

U.S. PATENT DOCUMENTS

| | | |
|---|---|---|
| 6,184,891 B1 | 2/2001 | Blinn |
| 6,384,824 B1 | 5/2002 | Morgan et al. |
| 6,417,858 B1 | 7/2002 | Bosch et al. |
| 6,456,285 B2 | 9/2002 | Hayhurst |
| 6,466,223 B1 | 10/2002 | Dorbie et al. |
| 6,532,009 B1 | 3/2003 | Fox et al. |
| 6,636,214 B1 | 10/2003 | Leather et al. |

OTHER PUBLICATIONS

Bresenham, Jack, "Teaching the graphics processing pipeline: cosmetic and geometric attribute implications," Computers and Graphics 25 (2001), pp. 343-349.
Chen, Cheng-Hsien et al., "Reduce the Memory Bandwidth of 3D Graphics Hardware with a Novel Rasterizer," Journal of Circuits, Systems, and Computers, vol. 11, No. 4 (2002) pp. 377-391.
Doctor, Louis et al., "Using raster scan in color graphics," Raster Technologies, Mini-Micro Systems, Dec. 1981, pp. 102-107.
Fuchs, H. et al., "Pixel-Planes: A VLSI-Oriented Design for 3-D Raster Graphics," CMCCS '81—ACCHO '81, pp. 343-347.
Parke, Frederic I., "Simulation and Expected Performance Analysis of Multiple Processor Z-Buffer Systems," Computer Engineering, Case Institute of Technology, pp. 48-56.
White, Martin et al., "The Tayra 3-D Graphics Raster Processor," Comput. and Graphics, vol. 21, No. 2, pp. 129-142, 1997.
Whitted, T., "Hardware Enhanced 3-D Raster Display System," CMCCS '81—ACCHO '81, pp. 349-356.
Yamachi, Hidemi et al., "A Technique for Object and Collision Detection by Z-buffer," Information Processing Society, vol. 43, No. 6, Jun. 2002, pp. 1899-1909.

*Primary Examiner*—Kee M. Tung
*Assistant Examiner*—Hau H Nguyen
(74) *Attorney, Agent, or Firm*—Lee & Hayes, PLLC

(57) ABSTRACT

Methods and systems for enabling components of a computer graphics rasterization pipeline to be arbitrarily ordered are described. Various embodiments can permit a programmer to specify the order that the individual components of the rasterization pipeline are to be employed to process pixel or texel data. Various embodiments can also allow the temporary result of previous stages to be used in later stages for blending.

15 Claims, 7 Drawing Sheets

METHODS AND SYSTEMS FOR RENDERING COMPUTER GRAPHICS

RELATED APPLICATIONS

This application is a continuation of and claims priority to U.S. patent application Ser. No. 10/706,493, the disclosure of which is incorporated by reference herein.

BACKGROUND

Computer graphics systems typically utilize instructions, implemented via a graphics program on a computer system, to specify calculations and operations needed to produce two-dimensional or three-dimensional displays. Exemplary graphics systems that include APIs that are commercially available for rendering three-dimensional graphs include Direct3D, available from Microsoft Corporation, of Redmond, Wash., and OpenGL by Silicon Graphics, Inc., of Mountain View, Calif.

Computer graphics systems can be envisioned as a pipeline through which data pass, where the data are used to define an image that is to be produced and displayed. At various points along the pipeline, various calculations and operations that are specified by a graphics designer are used to operate upon and modify the data.

In the initial stages of the pipeline, the desired image is described by the application using geometric shapes such as lines and polygons, referred to in the art as "geometric primitives." The derivation of the vertices for an image and the manipulation of the vertices to provide animation entail performing numerous geometric calculations in order to eventually project the three-dimensional world being synthesized to a position in the two-dimensional world of the display screen.

Primitives are constructed out of "fragments." These fragments have attributes calculated, such as color and depth. In order to enhance the quality of the image, effects such as lighting, fog, and shading are added, and anti-aliasing and blending functions are used to give the image a more realistic appearance. The processes pertaining to per fragment calculation of colors, depth, texturing, lighting, etc., are collectively known as "rasterization".

The fragments and their associated attributes are stored in a frame buffer. Once rasterization of the entire frame has been completed, pixel color values can then be read from the frame buffer and used to draw images on the computer screen.

To assist in understanding a typical computer graphics system, consider FIG. 1 which illustrates, generally at 100, a system that can implement a computer graphics process. System 100 comprises a graphics front end 102, a geometry engine 104, a rasterization engine 106, and a frame buffer 108. System 100 can typically be implemented in hardware, software, firmware or combinations thereof, and is also referred to as a "rendering pipeline".

Graphics front end 102 comprises, in this example, an application, primitive data generation stage 102a and display list generation stage 102b. The graphics front end generates geographic primitive data consumed by the subsequent pipeline stage(s). Geographic primitive data is typically loaded from a computer system's memory and saved in a display list in the display list stage 102b. All geometric primitives are eventually described by vertices or points.

Geometry engine 104 comprises, in this example, high order surface (HOS) tessellation 104a, and per-vertex operations stage 104b. In stage 104a, primitive data is converted into simple rasterizer-supported primitives (typically triangles) that represent the surfaces that are to be graphically displayed. Some vertex data (for example, spatial coordinates) are transformed by four-by-four floating point matrices to project the spatial coordinates from a position in the three-dimensional world to a position on the display screen. In addition, certain other advanced features can also be performed by this stage. Texturing coordinates may be generated and transformed. Lighting calculations can be performed using the vertex, the surface normal, material properties, and other light information to produce a color value. Perspective division, which is used to make distant objects appear smaller than closer objects in the display, can also occur in per-vertex operations stage 104b.

Rasterization engine 106 is configured to perform so-called rasterization of the re-assembled rasterizer-supported primitives. It comprises the following stages: triangle/point assembly 106a, setup 106b, parametric evaluation 106c, depth and stencil operations stage 106d, per-fragment operations stage 106e, and the blend and raster operations (ROP) stage 106f.

Rasterization refers to the conversion of vertex data connected as rasterizer-supported primitives into "fragments." Each fragment corresponds to a single element (e.g., a "pixel" or "sub-pixel") in the graphics display, and typically includes data defining color, transparency, depth, and texture(s). Thus, for a single fragment, there are typically multiple pieces of data defining that fragment. To perform its functions, triangle/point assembly stage 106a fetches different vertex components, such as one or multiple texture component(s), a color component, a depth component, and an alpha blending component (which typically represents transparency).

Setup stage 106b converts the vertex data into parametric function coefficients that can then be evaluated on a fragment coordinate (either pixel or sub-pixel) by fragment coordinate basis. Parametric evaluation stage 106c evaluates the parametric functions for all the fragments which lie within the given rasterizable primitive, while conforming to rasterizable primitive inclusion rules and contained within the frame buffer extents.

Depth and stencil operations stage 106d perform depth operations on the projected fragment depth and application specified fragment stencil operations. These operations apply to both the comparison function on the depth and stencil values, how the depth and stencil values should be updated in the depth/stencil buffer and whether the fragment should terminate or continue processing. In the idealized rasterization pipeline these operations take place just before frame buffer write-back (after blend and ROP stage 106f), but commonly these operations are valid before the per-fragment operations stage 106e, which enables early termination of many fragments and corresponding performance optimizations/improvements.

Per-fragment operations stage 106e typically performs additional operations that may be enabled to enhance the detail or lighting effects of the fragments, such as texturing, bump mapping, per-fragment lighting, fogging, and other like operations. Near the end of the rasterization pipeline is the blend and raster operation (ROP) stage 106f, which implements blending for transparency effects and traditional 2D blit raster operations. After completion of these operations, the processing of the fragment is complete and it is typically written to frame buffer 110 and potentially to the depth/stencil buffer 108. Thus, there are typically multiple pieces of data defining each pixel.

Now consider FIG. 2 which is a further embellishment of certain component in rasterization engine 106 In this example, rasterization engine 106 comprises, among other elements, a texture component 200, a specular component 202, a fog component 204 and an alpha blending component 206, each of which is configured to process fragment or pixel data to achieve a desired effect.

Specifically, texture component 200 implements texturing techniques and processes the pixel data to effect how the surface of an object or image appears. This can be done, for example, by using a one- or a two-dimensional image to mathematically modify the pixel data to achieve a desired effect. Specular component 202 implements specular lighting techniques and processes the pixel data to incorporate specular lighting effects. Fog component 204 processes the pixel data and implements a rendering technique that is used to simulate atmospheric effects such as haze, fog, and smog by fading object colors to a background color based on distance from the viewer. Fog also aids in the perception of distance from the viewer, giving a depth cue. Alpha blending component 206 implements techniques that process the pixel data to affect the opacity or transparency of the ultimately rendered pixel.

Typically, with respect to components 200-206, there is a whole menu of operations that can be performed by each individual component, and the system can select from this menu of operations and process the pixel data accordingly.

In the past, graphics systems have provided individual components, such as components 200-206, in a graphics pipeline in a fixed static order, the effect of which is to define the order in which the pixel data is processed. That is, the order in which the pixel data is processed in these systems and by these components is fixed and typically does not vary. For example, assume that all of the components are enabled for a particular amount of pixel data that is to be processed. In accordance with these past systems, the pixel data would first processed by the texture component to have a texture applied. After application of the texture, the pixel data would processed by the specular component to have specular lighting effects applied. Next, the pixel data would be processed by the fog component to have fog effects applied. Lastly, the pixel data would be processed by the alpha blending component to have a transparency/opacity effect applied. As an aside, having the alpha blending component as the last component in the pipeline is also a convenient architecture design choice for designers who can then mitigate the effects of a read after write hazard. That is, typically the alpha blending component requires a read operation from the frame buffer. After the alpha component operates on the pixel data, it is then typically written back to the frame buffer. The longer the pipeline is between the read and the write operations, the more likely it is for a read after write hazard to occur.

Systems such as the one described above, that impose a fixed order on the individual components of a rasterization pipeline, can result in rendered objects that do not accurately or correctly appear as they might in real life. For example, in some instances, a more realistic rendered image might be presented to a user if the pixel data associated with an object were able to be processed by the alpha blending component, and then the texture component. Yet, current systems do not allow this to occur. Additionally, having this fixed order of components in the rasterization pipeline can adversely affect the efficiency with which multi-pass algorithms operate on the pixel data.

Accordingly, this invention arose out of concerns associated with providing improved graphics systems and methods.

SUMMARY

Methods and systems for enabling components of a computer graphics rasterization pipeline to be arbitrarily ordered are described. Various embodiments can permit a programmer to specify the order that the individual components of the rasterization pipeline are to be employed to process pixel or texel data. Various embodiments can also allow the temporary result of previous stages to be used in later stages for blending.

DETAILED DESCRIPTION

Overview

Figure 1:
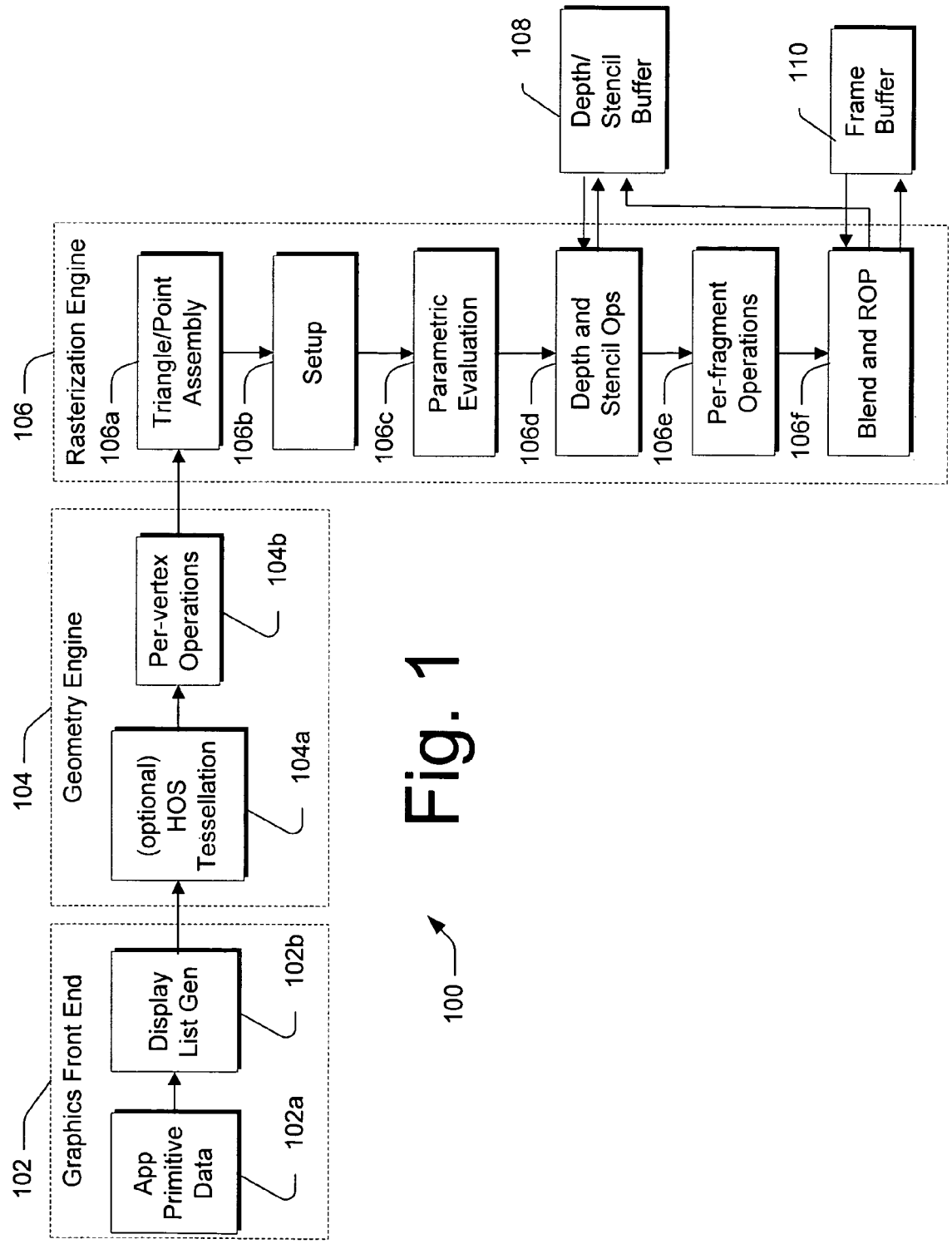
FIG. 1 is a block diagram that illustrates a computer graphics system.
Figure 2:
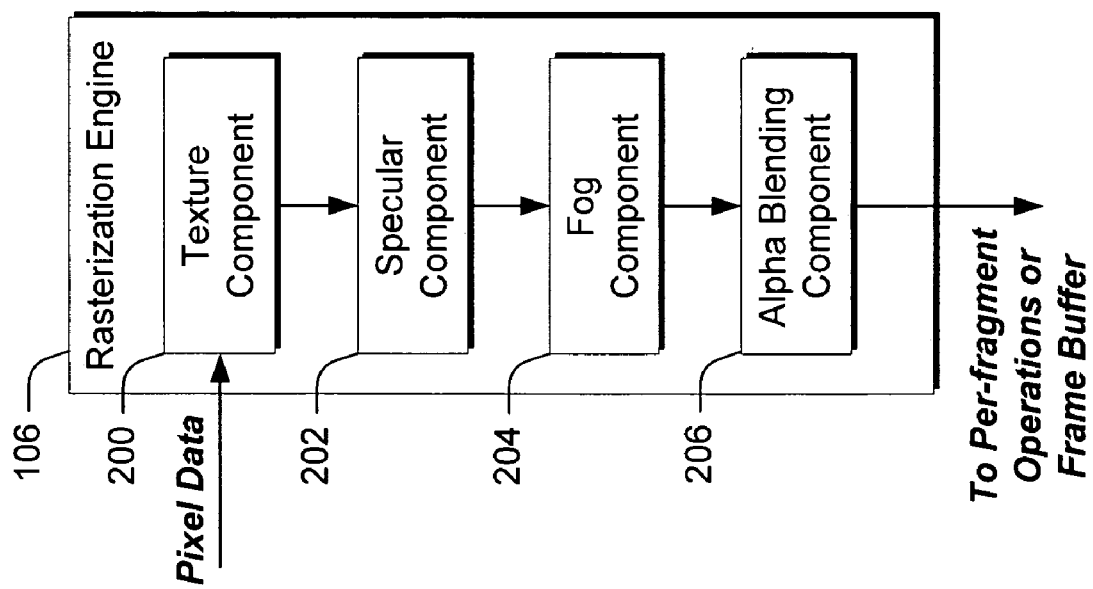
FIG. 2 is a block diagram that illustrates a rasterization stage or pipeline that can be utilized by a computer graphics system.

Reference will now be made in detail to exemplary embodiments, examples of which are illustrated in the accompanying drawings. The described embodiments are not intended to limit application of the claimed subject matter to only the specific embodiments described. On the contrary, the claimed subject matter is intended to cover alternatives, modifications and equivalents, which may be included within the spirit and scope of various features of the described embodiments.

Furthermore, in the following detailed description, numerous specific details are set forth in order to provide a thorough understanding of the described embodiments. It is quite possible, however, for the various embodiments to be practiced without these specific details, but with details that are different, but still within the spirit of the claimed subject matter. In some instances, well-known methods, procedures, components, and circuits that are ancillary to, but support the claimed embodiments have not been described in detail so as not to unnecessarily obscure aspects of the embodiments that are described.

Some portions of the detailed descriptions which follow are presented in terms of procedures, logic blocks, processing, and other symbolic representations of operations on data bits within a computer memory or cache. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, pixel data, or the like.

In the discussion that follows, terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices.

The embodiments described below pertain to a graphics subsystem that is programmed or programmable to operate upon pixel or texel data that is to be ultimately rendered to some type of display device. This graphics subsystem can comprise an entire graphics engine, including a transform engine for geometry calculations, a raster component comprising one or more of texture components, specular components, fog components, and alpha blending components, and any other components that can process pixel or texel data. In addition, such subsystem can comprise means for arbitrarily ordering components that include, without limitation, the texture components, specular components, fog components, and alpha blending components, and any other components that can process pixel or texel data. By allowing the various components to be arbitrarily ordered, pixel data can be processed in a manner that provides a more realistic representation when it is ultimately rendered on a display device, thus overcoming the limitations of the fixed-order component systems described above. In some embodiments, the graphics subsystem can be embodied in an integrated circuit component.

Exemplary System

Figure 3:
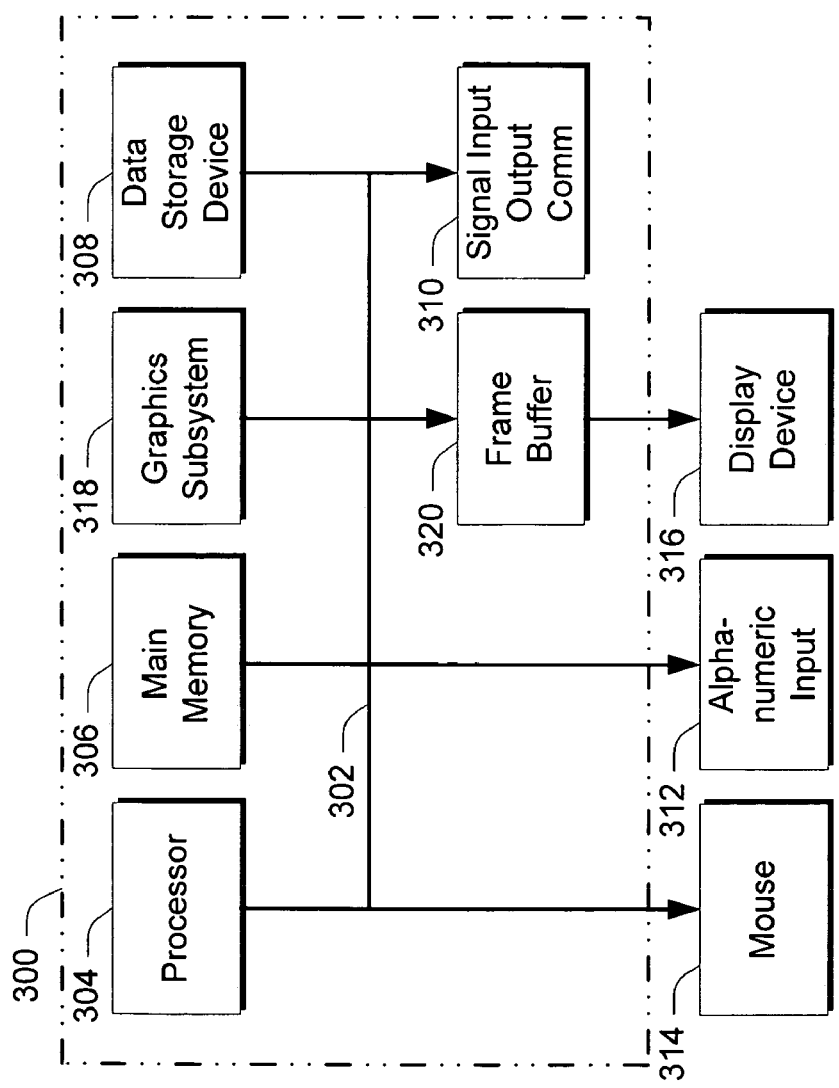
FIG. 3 is a block diagram of an exemplary computer system that can be utilized to implement one or more of the embodiments described below.

FIG. 3 illustrates an exemplary system 300 that can be utilized to implement one or more of the embodiments described below. This system is provided for exemplary purposes only and is not intended to limit application of the claimed subject matter.

System 300 exemplifies a computer-controlled, graphics system for generating complex or three-dimensional images. Computer system 300 comprises a bus or other communication means 302 for communicating information, and a processor 304 coupled with bus 302 for processing information. Computer system 300 further comprises a random access memory (RAM) or other dynamic storage device 306 (e.g. main memory) coupled to bus 302 for storing information and instructions to be executed by processor 304. Main memory 306 also may be used for storing temporary variables or other intermediate information during execution of instructions by processor 304. A data storage device 308 is coupled to bus 302 and is used for storing information and instructions. Furthermore, signal input/output (I/O) communication device 310 can be used to couple computer system 300 onto, for example, a network.

Computer system 300 can also be coupled via bus 302 to an alphanumeric input device 312, including alphanumeric and other keys, which is used for communicating information and command selections to processor 304. Another type of user input device is mouse 314 (or a like device such as a trackball or cursor direction keys) which is used for communicating direction information and command selections to processor 304, and for controlling cursor movement on a display device 316. This input device typically has two degrees of freedom in two axes, a first axis (e.g., x) and a second axis (e.g., y), which allows the device to specify positions in a plane.

In accordance with the described embodiments, also coupled to bus 302 is a graphics subsystem 318. Processor 304 provides graphics subsystem 318 with graphics data such as drawing commands, coordinate vertex data, and other data related to an object's geometric position, color, and surface parameters. In general, graphics subsystem 318 processes the graphical data, converts the graphical data into a screen coordinate system, generates pixel data (e.g., color, shading, texture) based on the primitives (e.g., points, lines, polygons, and meshes), and performs blending, anti-aliasing, and other functions. The resulting data are stored in a frame buffer 320. A display subsystem (not specifically shown) reads the frame buffer and displays the image on display device 316.

Exemplary Arbitrary Ordering Component Overview

Figure 4:
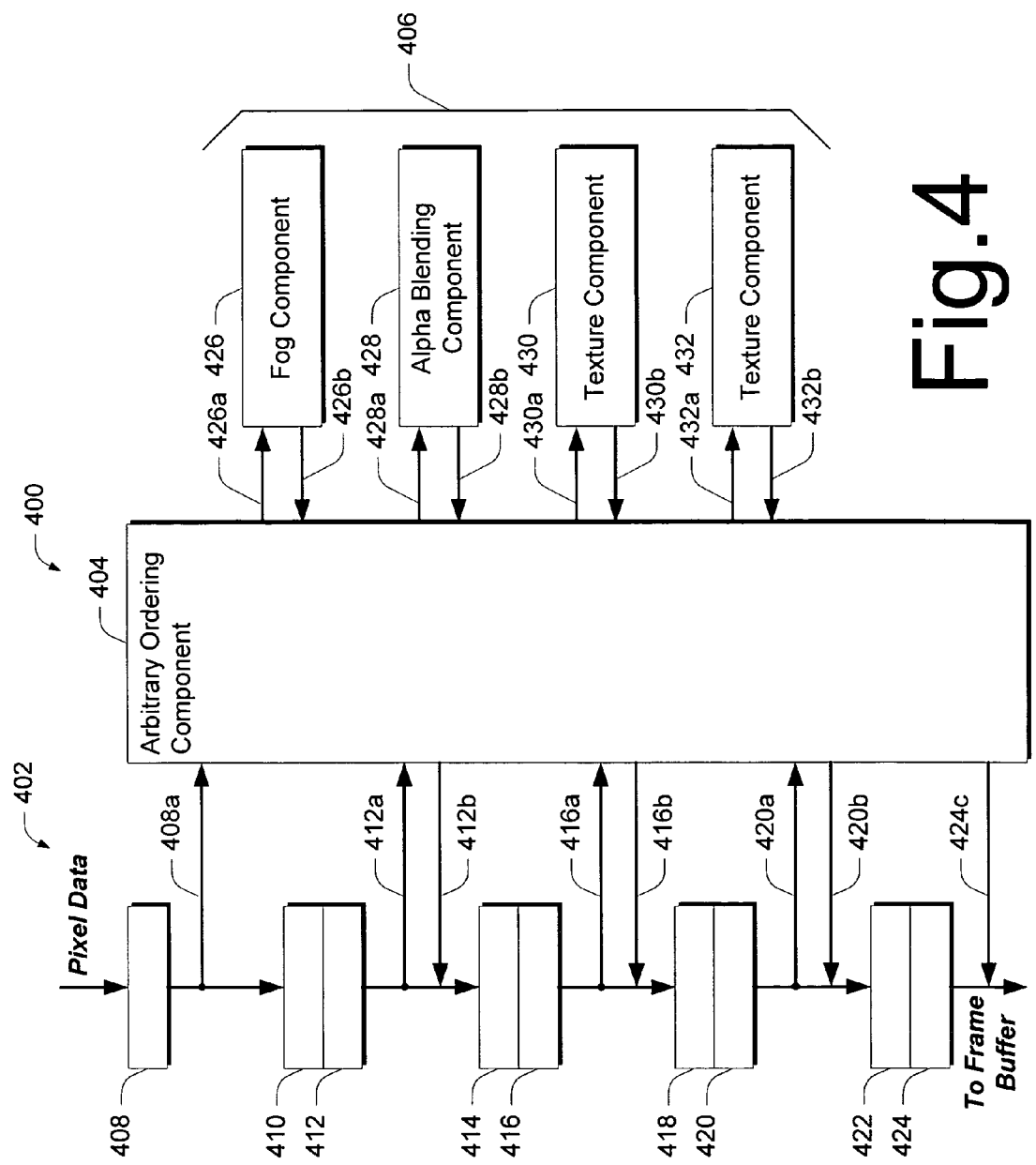
FIG. 4 is a block diagram of an exemplary arbitrary ordering component in accordance with one embodiment.

FIG. 4 illustrates an exemplary system, generally at 400, that enables components of a rasterization system or pipeline to be arbitrarily ordered, insofar as those components are employed to process pixel or texel data. System 400 can enable a programmer to specify the order that the individual components of the rasterization pipeline are to be employed to process pixel or texel data. System 400 can also allow the temporary result of any previous stage to be used in any later stage blending. Accordingly, in at least some embodiments, by enabling the individual components of the rasterization pipeline to be arbitrarily ordered, the fixed processing order that was necessarily imposed by past systems, and the problems associated with the fixed order, can be mitigated if not eliminated all together. As a result, a more realistically rendered image can be displayed on a display device. So, for example, the alpha blending component need not be the last component to process the pixel data.

In this example, system 400 comprises a stage assembly 402 comprising a plurality of stages, an arbitrary ordering component 404, and a component assembly 406 comprising a rasterization pipeline.

Stage assembly 402 comprises multiple stages which receive pixel data and pass the pixel data down a stage pipeline on its way to the frame buffer. Any suitable number of stages can be provided. In this example, nine stages are provided and are illustrated at 408-424. The pixel data that is received and processed can be in any suitable format. In one embodiment, the pixel data is in a so-called "8888" format in which eight bits each are provided for the colors red, green, and blue, with eight additional bits being provided for the alpha channel.

The stage assembly 402 is operably associated with the arbitrary ordering component 404 such that output of individual stages can be routed, by the arbitrary ordering component, to any of the components of component assembly 406 for processing. The output of a particular component of the component assembly 406 can then be routed, by the arbitrary ordering component 404, back to a particular stage of stage assembly 402 for further processing.

The width of the stage assembly pipeline stages is not constant. Data available at the top of the pipeline may be programmed to be used in the final blending stage, or input pixel data may be combined in the ROP stage. Additionally, the intermediate outputs of the blending stages may be needed by later blending stages other than the immediately following blending stage. These requirements of a generalized implementation mean that the width of the stage assembly pipeline stages varies. Specifically, the width increases going down the pipeline stages until after the last blender, where only frame buffer read data and the current intermediate pixel data are required.

As an example of an architecture that facilitates pixel data transfer between stage assembly 402 and arbitrary ordering component 404, consider the illustrated input/output lines that extend between individual stages of stage assembly 402 and the arbitrary ordering component 404. Specifically, notice that stage 408 comprises an input line by which it receives input pixel data. Notice also that the output of stage 408 is capable of being routed to stage 410 and optionally by virtue of input/output line 408a, to arbitrary ordering component 404. Thus, line 408a constitutes an output line of the stage and an input line of the arbitrary ordering component. Once the pixel data output of stage 408 is received by the arbitrary ordering component, the pixel data can be potentially provided to any of the components of component assembly 406. That is, in one embodiment, arbitrary ordering component 404 embodies hardware logic that can be utilized to route pixel data that it receives to any of a number of potential components of component assembly 406. The hardware of system 400, in accordance with this embodiment, can be implemented using semiconductor processing techniques, such as those that are employed in connection with building integrated circuits on semiconductive substrates such as silicon.

By virtue of being able route the pixel data to any of a number of components of the component assembly and in any order, the problems associated with the fixed order imposed by the rasterization pipeline described in the "Background" section above can be overcome.

Likewise, consider input/output lines 412a, 412b that extend between stage assembly 402 and arbitrary ordering component 404. Here, input/output line 412a is utilized to provide the output of stage 412 to the arbitrary ordering component for routing to a particular component of component assembly 406. Similarly, input/output line 412b is utilized to provide the output of one of the components of component assembly 406 to stage 414 for further processing. In much the same way as just described, input/output lines 416a, 416b, 420a, and 420b can be utilized to exchange pixel data between stage assembly 402 and arbitrary ordering component 404.

An input/output line 424c is provided and enables the pixel data that has been processed by the component assembly 406 to be routed to, for example, a write back stage and/or the frame buffer.

Component assembly 406 comprises, in this example, a fog component 426, an alpha blending component 428, a first texture component 430, and a second texture component 432. It should be appreciated and understood that any suitable number and type of rasterization components can be provided. Further, such components can be different from those that are specifically depicted.

Consider now, the input/output lines that extend between arbitrary ordering component 404 and the individual components of component assembly 406. Specifically, notice that an input/output line 426a provides pixel data from arbitrary ordering component 404 to fog component 426, and an input/output line 426b provides resultant pixel data that has been operated upon the fog component back to the arbitrary ordering component for routing to an individual stage of stage assembly 402. Similarly, an input/output line 428a provides pixel data from arbitrary ordering component 404 to alpha blending component 428, and an input/output line 428b provides resultant pixel data that has been operated upon the alpha blending component back to the arbitrary ordering component for routing to an individual stage of stage assembly 402. Similarly, input/output line 430a provides pixel data from arbitrary ordering component 404 to first texture component 430, and an input/output line 430b provides resultant pixel data that has been operated upon the first texture component back to the arbitrary ordering component for routing to an individual stage of stage assembly 402. Similarly, an input/output line 432a provides pixel data from arbitrary ordering component 404 to second texture component 432, and an input/output line 432b provides resultant pixel data that has been operated upon the second texture component back to the arbitrary ordering component for routing to an individual stage of stage assembly 402.

Figure 5:
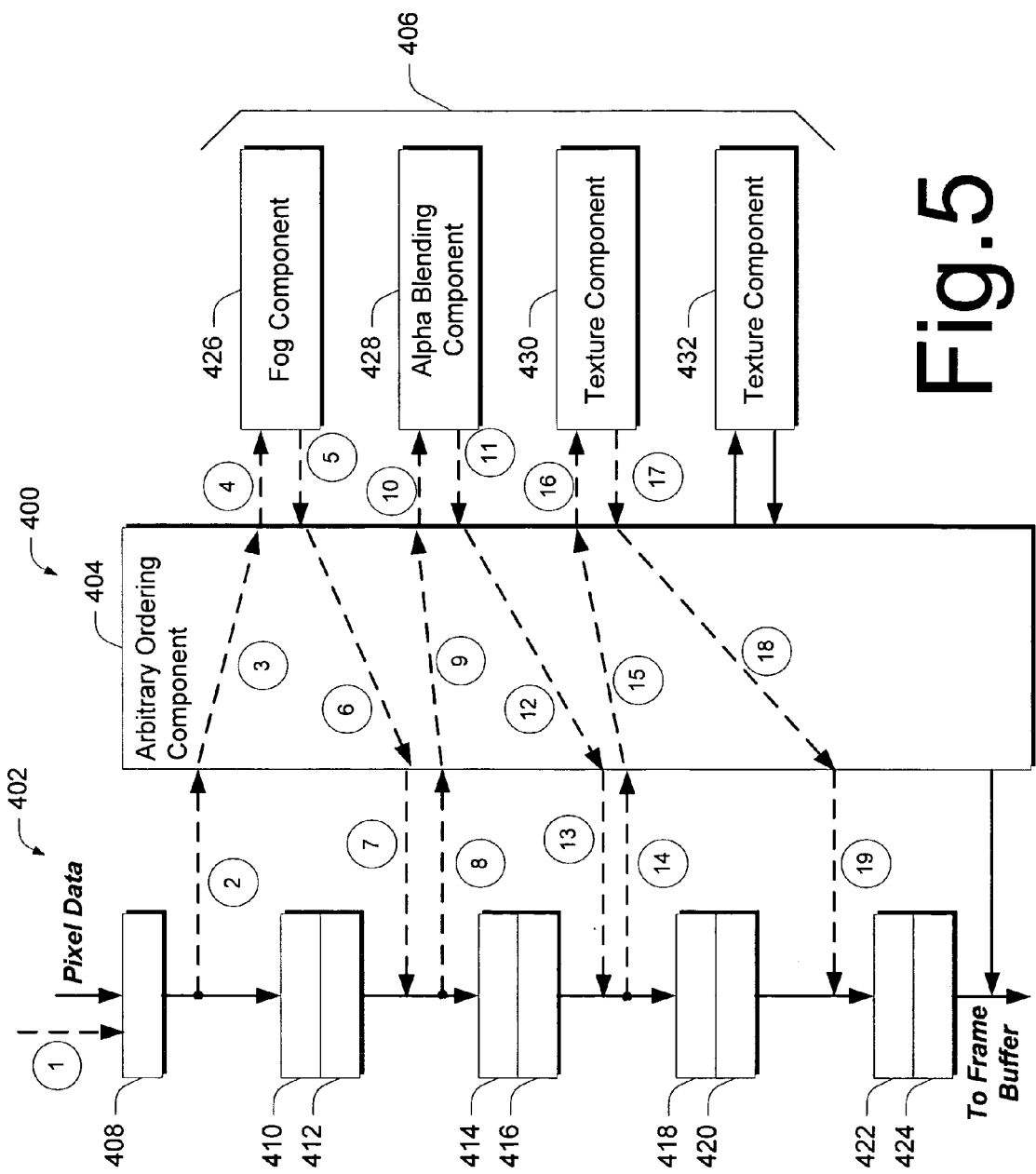
FIG. 5 is a block diagram of the FIG. 4 system, and illustrates an exemplary arbitrary flow of data in accordance with one embodiment.

As an example of the arbitrary order in which pixel data can be processed utilizing the system of FIG. 4, consider FIG. 5. There, a path is indicated by a dashed line and indicates an exemplary path that can be taken by pixel data through component assembly 406. The exemplary path is designated with encircled numbers to assist in the explanation that follows.

Specifically, the pixel data is first received at stage 1 (encircled 1) and then routed (encircled 2) to arbitrary ordering component 404. The arbitrary order component then routes (encircled 3) the pixel data to fog component 426, where it is received (encircled 4) and processed. The fog component then outputs (encircled 5) the resultant pixel data to the arbitrary ordering component which then routes (encircled 6) the resultant pixel data to stage 414 (encircled 7). The pixel data is also then routed (encircled 8) to the arbitrary ordering component which, in turn, routes (encircled 9) the pixel data to alpha blending component 428 where it is received (encircled 10) and processed. The alpha blending component outputs (encircled 11) the resultant pixel data to the arbitrary ordering component which routes (encircled 12) the pixel data to stage 418 (encircled 13). The pixel data is also routed (encircled 14) back to the arbitrary ordering component which, in turn, routes (encircled 15) the pixel data to texture component 430, where it is received (encircled 16) and processed accordingly. Texture component 430 outputs (encircled 17) resultant pixel data to the arbitrary ordering component which, in turn, routes (encircled 18) the pixel data to stage 422 (encircled 19).

Thus, in this example, the pixel data that is received at the front end of the pixel pipeline is first processed for fog, then alpha blended, then textured to provide, in this particular circumstance, a more realistically-appearing rendered image. It is to be appreciated that the FIGS. 4 and 5 system can support multiple passes to provide realistically-rendered images. It should be noticed that in this example, alpha blending is not confined to occur at the end of the rasterization pipeline. Rather, by virtue of the arbitrary ordering component, alpha blending can occur at any conceivable location in the rasterization pipeline.

Exemplary Arbitrary Ordering Component—Implementation Example

The arbitrary ordering component 404 in the above example can be implemented in any suitable hardware, software, firmware or combination thereof. In some embodiments, the arbitrary ordering component is implemented in hardware and utilizes hardware logic that is flexibly programmable to accommodate arbitrary ordering of the components of the rasterization pipeline. In the example about to be described, one specific implementation of the arbitrary ordering component is described. It is to be appreciated and understood that such description is not intended to limit application of the claimed subject matter to the specifically described embodiment, except where so specified in the claims.

Figure 6:
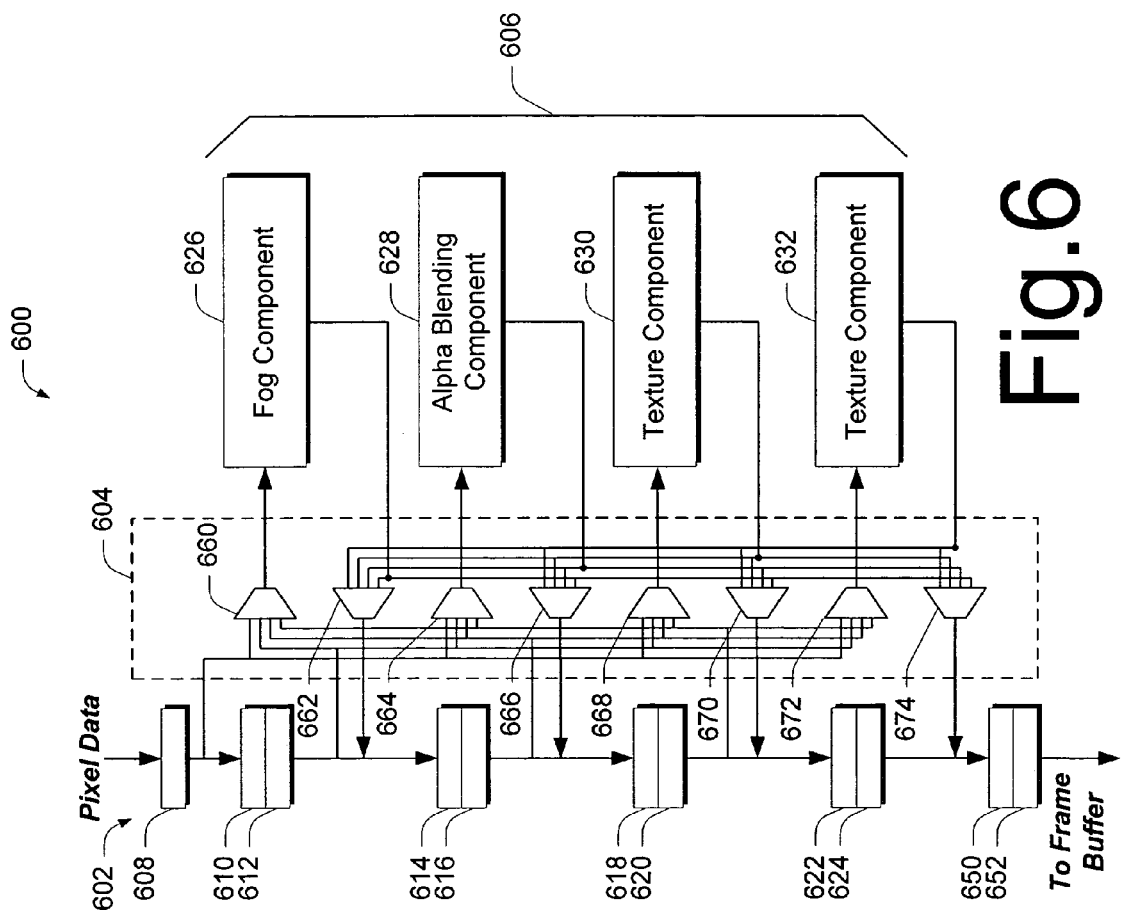
FIG. 6 is a block diagram of an exemplary arbitrary ordering component, in accordance with one specific implementation example.

FIG. 6 shows an exemplary system 600 in accordance with one embodiment. System 600 comprises a stage assembly 602 comprising a plurality of stages, an arbitrary ordering component 604, and a component assembly 606 comprising a rasterization pipeline.

In this example, stage assembly 602 comprises stages 608-624, and stages 650 and 652. These stages function similarly to those described above in connection with the FIG. 4 embodiment. In this example, however, stages 650 and 652 can be provided for purposes that will be discussed below.

Each of components 626, 628, 630, and 632 can comprise a front end multiplexer to receive the pixel data, and associated arithmetic logic units (ALUs) that are configured to mathematically process the pixel data, as will be appreciated and understood by those of skill in the art.

In this particular example, arbitrary ordering component 604 is implemented using a plurality of addressable multiplexers 660-674. Each of the individual components of component assembly 606 has an associated input multiplexer that provides, as an input to the component, pixel data that is to be operated upon by the component. For example, the output of multiplexer 660 serves as the input to fog component 626; the output of multiplexer 664 serves as the input to alpha blending component 628; the output of multiplexer 668 serves as the input to texture component 630; and the output of multiplexer 672 serves as the input to texture component 632. Each of a first group of multiplexers 660, 1664, 668, and 672 has multiple inputs, and each of the multiple inputs is respectively associated with a different output of a stage of stage assembly 602.

For example, the output of stage 608 serves as the topmost input to each of multiplexers 660, 664, 668, and 672. Likewise, the output of stage 612 serves as the next input to each of multiplexers 660, 664, 668, and 672. Similarly, the output of stage 616 serves as the next input to each of multiplexers 660, 664, 668, and 672. Finally, in this example, the output of stage 620 serves as the next input to each of multiplexers 660, 664, 668, and 672. Thus, each of the outputs of stages 608, 612, 616, and 620 is individually selectable by one of multiplexers 660, 664, 668, and 672 for provision to the rasterization component associated with the multiplexer.

Now consider a second group of multiplexers 662, 666, 670, and 674. Each of these multiplexers comprises multiple inputs and an output. Each of the inputs of each multiplexer is operably connected with a different individual component of the rasterization pipeline. Specifically, notice that the output of fog component 626 is the bottommost input for each of multiplexers 662, 666, 670, and 674. Likewise, the output of alpha blending component 628 is the next input for each of multiplexers 662, 666, 670, and 674. Similarly, the output of one texture component 630 is the next input for each of multiplexers 662, 666, 670, and 674. Finally, in this example, the output of the other texture component 632 is the topmost input for each of multiplexers 662, 666, 670, and 674. Each of multiplexers 662, 666, 670, and 674 has an output that is provided to a different stage of stage assembly 602. Specifically, the output of multiplexer 662 provides the input to stage 614. Similarly, the output of multiplexer 666 provides the input to stage 618. Likewise, the output of multiplexer 670 provides the input to stage 622. Finally, in this example, the output of multiplexer 674 provides the input to stage 650.

Thus, using multiplexers 662, 666, 670, and 674, the output of the respective rasterization components can be provided to any of the stages whose input is associated with a multiplexer output.

By virtue of the cooperation between multiplexers 660-674, the order in which pixel data is processed by components of the rasterization pipeline can be quite arbitrary. Accordingly, a great deal of flexibility is provided for processing pixel data that can be utilized to render realistic images on a display device.

As an example, consider again the data path of the FIG. 5 example. In the FIG. 6 embodiment, the pixel data would be processed as follows. First, the pixel data would be received at stage 608 whose output would be selected by multiplexer 660. As a result, the pixel data would be provided to fog component 626 for processing. The output of component 626 would then be selected by multiplexer 662 for provision to stage 614. Additionally, the pixel data from multiplexer 662 would be selected by multiplexer 664 for provision to the alpha blending component 628. The output of the alpha blending component would then be selected by multiplexer 666 for provision to stage 618. Additionally, the pixel data from multiplexer 666 would be selected by multiplexer 668 for provision to texture component 630, whose output would be selected by multiplexer 674 for provision to stage 650 and subsequently written out to the frame buffer.

In this particular implementation example, stages 650 and 652 are used for special purposes. Specifically, stage 650 can be utilized as a packing and dithering stage. That is, at this point, the pixel data that is written into this stage is in the 8888 format (8-bits each for RGB, and 8-bits for the alpha blend channel). In order to save memory, a 16-bit frame buffer which requires data to be in a different format (e.g. a "565" or "1555" format), can be utilized. Thus, at this stage a packing function can be performed to transform this data into this different format. Additionally, when a system uses lower resolution graphics, dithering functions can be utilized to increase the apparent color depth or resolution or the data, as will be appreciated and understood by those of skill in the art.

Stage 652 can be utilized as a "write back" stage. Specifically, in the writeback stage, there are 2D raster operations (i.e. "ROPs") that can be performed. For example, the pixel data can be logically operated upon in any suitable way such as being XORed with the frame buffer data.

From these stages, the data can then be written out of the frame buffer.

Exemplary Methods

Figure 7:
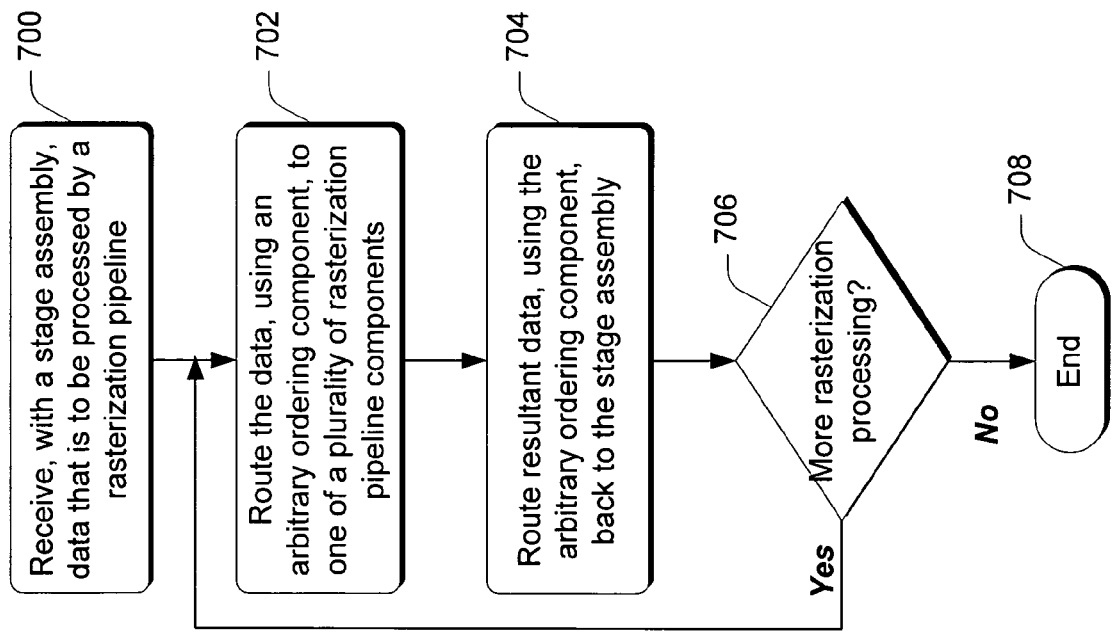
FIG. 7 is a flow diagram that describes steps in a method in accordance with one embodiment.

FIG. 7 is a flow diagram that describes steps in a method in accordance with one embodiment. The method can be implemented in connection with any suitable hardware, software, firmware, or combination thereof. In the illustrated and described embodiment, the method can be implemented in connection with systems such as those shown in FIGS. 2-6.

Step 700 receives, with a stage assembly, data that is to be processed by a rasterization pipeline. The data can comprise any suitable type of data that is processed by rasterization pipelines and in any suitable format. For example, in the embodiment described above, the data that is received is pixel data in the 8888 format. Step 702 routes the data using an arbitrary ordering component, to one of a plurality of rasterization pipeline components. Exemplary pipeline components are shown and described above. The arbitrary ordering component that is utilized to perform the routing functionality can comprise any suitable type of component having any suitable type of configuration. One characteristic of such a configured component includes the ability to be programmed to allow pixel data to routed seemingly arbitrarily among the different components of the rasterization pipeline. Another characteristic of such a configured component is that it can be programmed to allow the alpha blending component to be utilized to process pixel data at a point in the processing in which the alpha blending component is not the last rasterization pipeline component to process the pixel data.

One specific arbitrary ordering component is shown and described in connection with FIG. 6. There, an assembly of selectable multiplexers is interposed between the stage assembly and the rasterization pipeline in a manner that permits the pixel data to be arbitrarily passed between and among the stage assembly and the rasterization pipeline. It is to be appreciated and understood that other architectures can be employed to implement the arbitrary ordering component, and that such other architectures are within the spirit and scope of the claimed subject matter.

Step 704 routes resultant data, using the arbitrary ordering component, back to the stage assembly. This step can be performed after the pixel data has been processed by a particular component of the rasterization pipeline. Step 706 determines whether more rasterization processing is to take place. If more rasterization processing is to take place, then the method returns to step 702. If, on the other hand, no more rasterization processing is to take place, the rasterization processing can terminate at step 708.

CONCLUSION

The methods and systems described above can overcome problems associated with those graphics systems that impose a fixed order on individual components of a rasterization pipeline. By providing flexibility in the order that pixel data is processed, rendered objects can be provided that more accurately or correctly appear, as they might in real life. Additionally, the described methods and systems can provide rasterization pipelines that are more efficiently employed in connection with multi-pass algorithms operate on the pixel data.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
providing a stage assembly comprising a plurality of stages configured to receive data that is to be processed by a rasterization pipeline;
providing an arbitrary ordering component operably associated with the stage assembly, the arbitrary ordering component comprising a first group of multiplexers and a second group of multiplexers;
providing a rasterization pipeline comprising a plurality of components configured to process data from the stage assembly;
the first group of multiplexers having individual inputs received from the stage assembly and individual outputs provided to the rasterization pipeline; and
the second group of multiplexers having individual inputs received from the rasterization pipeline and individual outputs provided to the stage assembly.

2. The method of claim 1, wherein each individual component of the rasterization pipeline has an associated first group multiplexer from which it receives an input.

3. The method of claim 1, wherein each individual input of a multiplexer of the second group is associated with a different component of the rasterization pipeline.

4. The method of claim 1, wherein each individual component of the rasterization pipeline has an associated first group multiplexer from which it receives an input, and each individual input of a multiplexer of the second group is associated with a different component of the rasterization pipeline.

5. The method of claim 1, wherein the data comprises pixel data.

6. The method of claim 1, wherein the rasterization pipeline comprises at least one alpha blending component, and the arbitrary ordering component is configured to enable the alpha blending component to process the data before at least one other component of the rasterization pipeline.

7. The method of claim 1, wherein at least some of the stages have an output line that can route data to a next stage and to the multiplexers of the first group of multiplexers.

8. The method of claim 1, wherein at least some of the stages have an input line that can receive data from a previous stage, or from a multiplexer of the second group of multiplexers.

9. One or more computer-readable media having computer-readable instructions thereon which, when executed by one or more processors, execute a method comprising:
receiving, in a stage assembly, pixel data that is to be processed by a rasterization pipeline having a plurality of components comprising at least a texture component, a fog component and an alpha blending component;
selecting a first multiplexer, whose inputs are received from different stages of the stage assembly, sufficient to route the pixel data to one of the components of the rasterization pipeline;
processing the pixel data with the component to provide resultant pixel data; and
selecting a second multiplexer, whose inputs are received from different components of the rasterization pipeline, sufficient to route the resultant pixel data to the stage assembly.

10. The one or more computer-readable media of claim 9, wherein said act of selecting the first multiplexer can be performed such that the alpha blending component is not the last component in the rasterization pipeline to process the pixel data.

11. The one or more computer-readable media of claim 9, wherein the first multiplexer comprises one multiplexer of a first group of multiplexers, and the second multiplexer comprises one multiplexer of a second group of multiplexers, each individual multiplexer of the first group having an output that is associated with a respective one of the components of the rasterization pipeline, each individual multiplexer of the second group having an output that is associated with a different respective stage of the stage assembly.

12. One or more computer-readable media having computer-readable instructions thereon which, when executed, implement a method comprising:
associating a stage assembly with an arbitrary ordering component, the stage assembly comprising a plurality of stages configured to receive data that is to be processed by a rasterization pipeline, the arbitrary ordering component being configured to enable an arbitrary order of components of the rasterization pipeline to be specified for processing data from the stage assembly; and
associating a rasterization pipeline with the arbitrary ordering component, the rasterization pipeline comprising a plurality of components configured to process data from the stage assembly,
wherein the acts of associating are performed by operably connecting a plurality of multiplexers between the stage assembly and rasterization pipeline, wherein at least some of the multiplexers route pixel data from the stage assembly to the rasterization pipeline, and at least other of the multiplexers route resultant pixel data from the rasterization pipeline to the stage assembly.

13. The one or more computer-readable media of claim 12, wherein the act of associating the stage assembly comprises associating the stage assembly with a rasterization pipeline comprising at least one alpha blending component, the arbitrary ordering component being configured to enable the alpha blending component to process the data before another component of the rasterization pipeline.

14. The one or more computer-readable media of claim 12, wherein the act of associating the stage assembly comprises associating the stage assembly with a rasterization pipeline comprising at least one fog component, at least one alpha blending component, and at least one texture component, the arbitrary ordering component being configured to enable the alpha blending component to process the data before another component of the rasterization pipeline.

15. The one or more computer-readable media of claim 12, wherein the act of associating the stage assembly comprises associating the stage assembly with a rasterization pipeline comprising at least one fog component, at least one alpha blending component, at least one texture component, and at least one specular component, the arbitrary ordering component being configured to enable the alpha blending component to process the data before another component of the rasterization pipeline.

\* \* \* \* \*